(12) United States Patent
Schoeb

(10) Patent No.: US 8,349,172 B2
(45) Date of Patent: Jan. 8, 2013

(54) FILTER AND PUMP UNIT, FILTER AND PUMP APPARATUS HAVING SUCH A UNIT AND ALSO METHOD FOR FILTERING OUT

(75) Inventor: Reto Schoeb, Rudolfstetten (CH)

(73) Assignee: Levitronix Technologies, LLC, Waltham, MA (US)

( * ) Notice: Subject to any disclaimer, the term of this patent is extended or adjusted under 35 U.S.C. 154(b) by 1293 days.

(21) Appl. No.: 12/011,262

(22) Filed: Jan. 25, 2008

(65) Prior Publication Data

US 2008/0190870 A1 Aug. 14, 2008

(30) Foreign Application Priority Data

Feb. 14, 2007 (EP) .................................. 07102352

(51) Int. Cl.
*B01D 29/88* (2006.01)
*B01D 35/26* (2006.01)
*B01D 29/92* (2006.01)
*F04D 13/02* (2006.01)

(52) U.S. Cl. ..... 210/130; 210/136; 210/232; 210/416.1; 210/434; 417/420; 415/11; 415/121.2

(58) Field of Classification Search .................. None
See application file for complete search history.

(56) References Cited

U.S. PATENT DOCUMENTS

| 3,736,075 | A | * | 5/1973 | Otto | 417/366 |
| 4,601,821 | A | * | 7/1986 | Sherman et al. | 210/282 |
| 5,062,951 | A | * | 11/1991 | Tominaga | 210/167.23 |
| 5,401,401 | A | * | 3/1995 | Hickok et al. | 210/167.27 |
| 5,449,454 | A | * | 9/1995 | Hickok | 210/188 |
| 5,972,210 | A | * | 10/1999 | Munkel | 210/90 |
| 6,100,618 | A | * | 8/2000 | Schoeb et al. | 310/90.5 |
| 6,143,133 | A | * | 11/2000 | Gommel | 162/208 |
| 7,357,858 | B2 | * | 4/2008 | Schoeb | 210/85 |
| 2004/0226871 | A1 | * | 11/2004 | Schob | 210/184 |
| 2008/0190870 | A1 | * | 8/2008 | Schoeb | 210/805 |

FOREIGN PATENT DOCUMENTS

| DE | 22 05 959 A1 | 8/1972 |
| DE | 101 60 533 A1 | 6/2003 |
| EP | 0 920 896 A | 6/1999 |
| EP | 1477216 A1 * | 11/2004 |
| EP | 1967245 A1 * | 9/2008 |
| GB | 2 141 040 A | 12/1984 |

\* cited by examiner

*Primary Examiner* — Robert James Popovics
(74) *Attorney, Agent, or Firm* — Kilpatrick Townsend & Stockton LLP

(57) ABSTRACT

A filter and pump unit is proposed for the filtering out of particles from a fluid, there being a filter housing (2) which bounds a filter space (3) and has an inlet (21) and also an outlet (22) for the fluid to be filtered as well as a filter element (4) provided in the filter space (3), the filter element demarcating an inlet region (31) from an outlet region (32) of the filter space (3), with the inlet region (31) communicating with the inlet (21) and the outlet region (32) communicating with the outlet (22), there also being an impeller (5) which, as part of a rotary pump, can pump the fluid from the inlet region (31) through the filter element (4) into the outlet region (32), characterized in that a flow connection (6) is provided between the outlet region (32) and the impeller (5) so that at least a part of the fluid can flow back from the outlet region (32) to the impeller (5). Furthermore, a method for the filtering out of the particles from a fluid is proposed.

12 Claims, 6 Drawing Sheets

Figure 1:
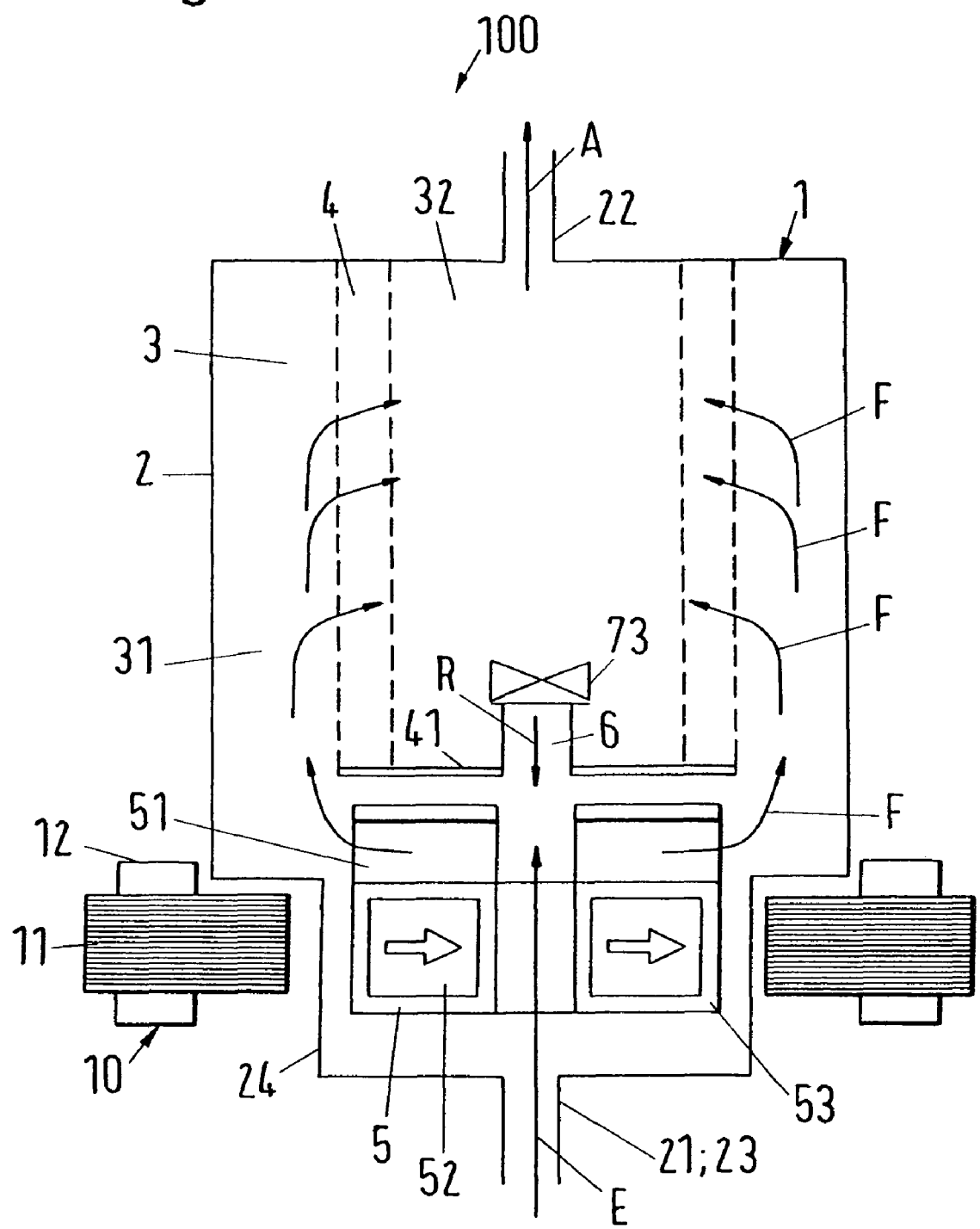

FILTER AND PUMP UNIT, FILTER AND PUMP APPARATUS HAVING SUCH A UNIT AND ALSO METHOD FOR FILTERING OUT

This application claims the priority of European Application No. 07102353.7, filed on Feb. 14, 2007, the disclosure of which is incorporated herein by reference.

The invention relates to a filter and pump unit for the filtering out of particles from a fluid and also to a filter and pump apparatus having such a unit in accordance with the preamble of the respective independent apparatus claim. The invention furthermore relates to a method for the filtering out of particles in accordance with the preamble of the independent method claim.

In many industrial processes the need exists to subject a fluid to filtration before its prior use in order to remove undesired contamination from the fluid. As one example, the manufacturing of semiconductors and chips is named. By way of example the chemicals such as acids or photo paints (photo-resists) which serve for the cleaning, etching or masking of the wafer or of the semiconductors have to satisfy the highest demands with respect to their purity. For the semiconductor structures which are usual nowadays, which have gate lengths in the range of 100 nm or less, it is necessary to use highly pure chemicals. Even particles of a few tenths of nanometer size in the chemicals can lead to contamination which makes the treated wafer unusable.

Another example is immersion lithography, which is used in the most progressive wafer manufacturing processes for the exposure of the semiconductor structures. Here highly pure water is used between the projector lens and the wafer surface as an immersion liquid. This liquid must also be free of particles which are of the order of magnitude of the conductor tracks to be exposed.

Accordingly such fluids must be filtered with very fine filters in order to ensure the desired purity. Nowadays filter elements are already commercially available having a pore size of approximately 30 nm. Such filter elements with the finest of meshes typically have no uniform "pore size". Accordingly one characterizes these filter elements by their nominal pore size and their retention efficiency, which is a measure of a number of particles of the nominal size which can be filtered from a fluid using the filter element. With a retention efficiency of 99% one can for example assume that with a filter element of given nominal pore size 99% of the particles can be filtered out which are larger than the nominal size.

Since the development aims at a further miniaturization of semiconductor structures or chip structures it is desirable to have filter units available which can reliably filter even smaller particles out of a fluid, for example particles of less than 15 nm.

Moreover, such processes are frequently carried out in clean rooms of the highest clean room classification. Because these clean rooms are very cost intensive, it is desirable to have available devices which are as small and compact as possible and which require little space.

Accordingly, the invention is dedicated to the task of proposing a compact filter and pump unit with which very small particles can also be reliably filtered out of the fluid. Moreover, a filter and pump apparatus of this kind should be made available. Furthermore, the invention is intended to propose a method with which very small particles can be filtered out of the fluid.

The subject matter of the invention which satisfies this object from the point of view of an apparatus and from the point of view of a technical method is characterized by the independent claims of the respective category.

In accordance with the invention a filter and pump unit is thus proposed for the filtering of particles out of a fluid having a filter housing which bounds a filter space and has an inlet and also an outlet for the fluid to be filtered as well as a filter element provided in the filter space, the filter element demarcating an inlet region from an outlet region of the filter space, with the inlet region communicating with the inlet and the outlet region communicating with the outlet, there also being an impeller which, as part of a rotary pump, can pump the fluid from the inlet region through the filter element into the outlet region. A flow connection is provided between the outlet region and the impeller so that at least a part of the fluid can flow back from the outlet region to the impeller.

In the filter and pump unit in accordance with the invention at least a part of the fluid is re-circulated in the operating state after having passed through the filter element and is once again pumped through the filter element. The fluid is preferably multiply re-circulated and only a small part of the fluid pumped by the impeller is let away through the outlet after passing through the filter element. It has been shown that, as a result of multiple through-flow of the filter element by the fluid, particles can also be filtered out which are substantially smaller than the pore size of the filter element. Thus, through the re-circulation of the fluid in the filter and pump unit a situation can be achieved in which even small particles can be filtered out which could not be kept back with a single flow through the filter element. In this manner the quality of the filtering with the filter and pump unit in accordance to the invention can be significantly improved. Moreover, since the filter unit with the impeller can be combined into a filter and pump unit, a very compact and space-saving design results.

With regard to a particularly compact constructional form the impeller is preferably arranged in the filter housing. This also has the advantage that the filter element and the impeller are integrated into a common constructional unit.

The impeller is preferably designed for a contact-free magnetic journaling. Thus magnetic bearings and lead-throughs into the interior of the filter and pump unit can be dispensed with. This also has the advantage that contamination of the fluid is avoided, such as can for example occur through abrasion in a mechanical bearing. The danger also does not exist—as a mechanical bearing—that the partly aggressive or abrasive fluids which are filtered cause bearing damage.

A further advantageous measure consists in providing means which prevent a flow short circuit between the inlet and the outlet. Thus it is ensured that the fluid can only pass through the filter element from the inlet to the outlet.

Furthermore it is advantageous to provide a check-valve in the flow connection between the outlet region and the impeller. In this way a situation can be avoided in which fluid may flow from the impeller or from the inlet flows through the flow connection into the outlet region without passing through the filter element.

The filter and pump unit is preferably designed flow-mechanically such that, in the operating state, the quantity of fluid which can flow per unit of time through the outlet is smaller than the quantity of fluid which can flow per unit of time through the flow connection out of the outlet region back to the impeller. In this way it is ensured that the fluid is re-circulated multiply through the filter element before it flows out of the outlet, whereby the quality of the filtration is increased. The ratio of the quantity of re-circulated fluid to outflowing fluid should amount to more than 2 to 1, preferably 10 to 1, 50 to 1 or 100 to 1.

An advantageous measure lies in providing means which enable a setting, in particular a step-less setting of the ratio between the quantity of fluid which flows per unit of time through the outlet and the quantity of fluid which flows per unit of time through the flow connection out of the outlet region back to the impeller. In this way the filter and pump unit can be adapted in a very simple manner to the respective application.

In particular at least one regulating valve can be provided as such a means which enables the setting of the ratio of the two quantities of fluid.

For the setting of the ratio of the two quantities of fluid it is advantageous when a regulating valve is provided at the flow connection between the outlet region and the impeller.

Under practical aspects it is a preferred variant when the filter housing with the filter element and the impeller is designed as a disposable unit. In accordance with the invention a filter and pump apparatus with a filter and pump unit is further proposed, with the filter and pump unit being designed in accordance with the invention and also having a drive unit for the driving of the impeller.

The explanations given with respect to the filter and pump unit apply in the same sense and manner also for the filter and pump apparatus.

The drive unit is preferably magnetically coupled to the impeller. Thus no mechanical coupling is necessary between the drive unit and the impeller and consequently also no lead-through for a shaft into the filter housing.

The impeller is preferably formed as an integral rotor and the drive unit with the impeller is designed as a bearing-free motor, since this permits a particularly compact design, in which, in the operating state, a mechanical contact with bearings or with the drive units is necessary neither for the journaling nor for the driving of the impeller.

Furthermore, the invention proposes a method for the filtering out of particles from a fluid by means of a filter and pump unit having a filter housing which bounds a filter space and which has an inlet as well as an outlet for the fluid to be filtered, as well as a filter element provided in the filter space which demarcates an inlet region from an outlet region of the filter space wherein the inlet region communicates with the inlet and the outlet region with the outlet wherein, in this method, the fluid is pumped by means of an impeller from the inlet region through the filter element into the outlet region. At least a part of the fluid is recycled from the outlet region to the impeller and flows a plurality of times through the filter element.

As a result of the multiple flow through the filter element particles can be filtered out of the fluid which are significantly smaller than the nominal pore size of the filter element. This signifies an important improvement in the quality of the filtering.

The method is preferably used to filter a fluid which contains particles which are smaller than the nominal pore size of the filter element.

Further advantageous measures and preferred embodiments of the invention result from the dependent claims.

Figure 2:
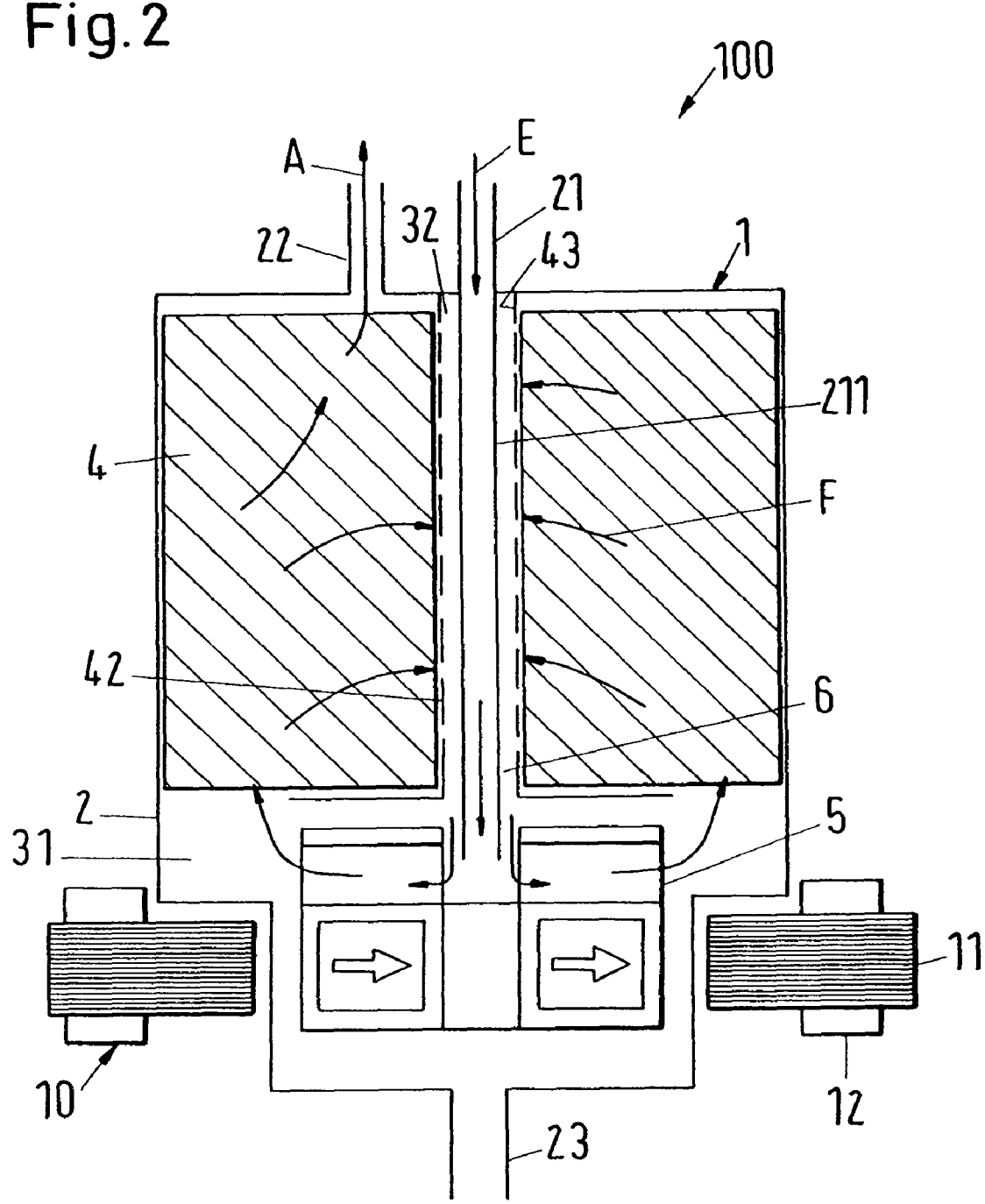
Figure 3:
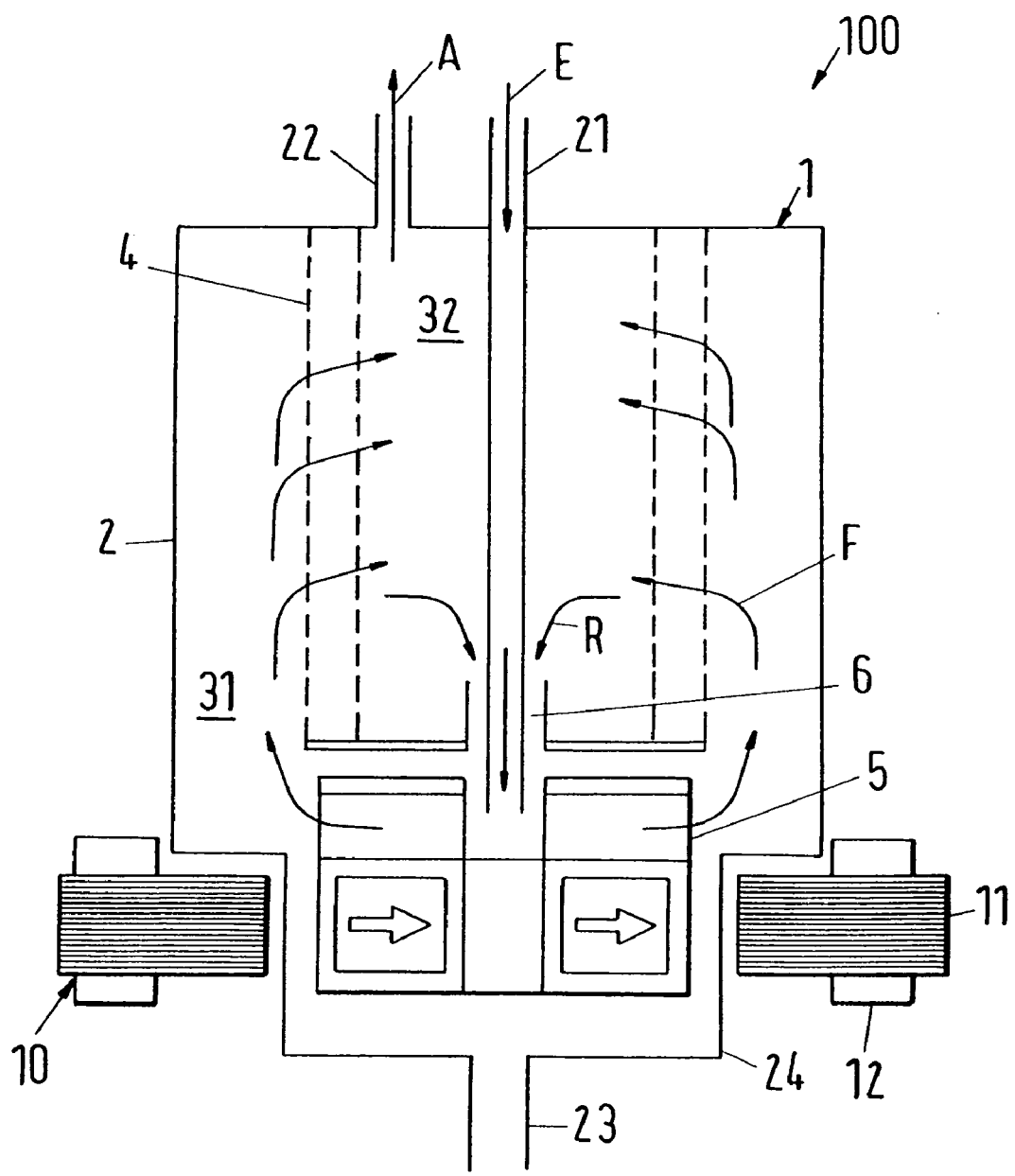
Figure 4:
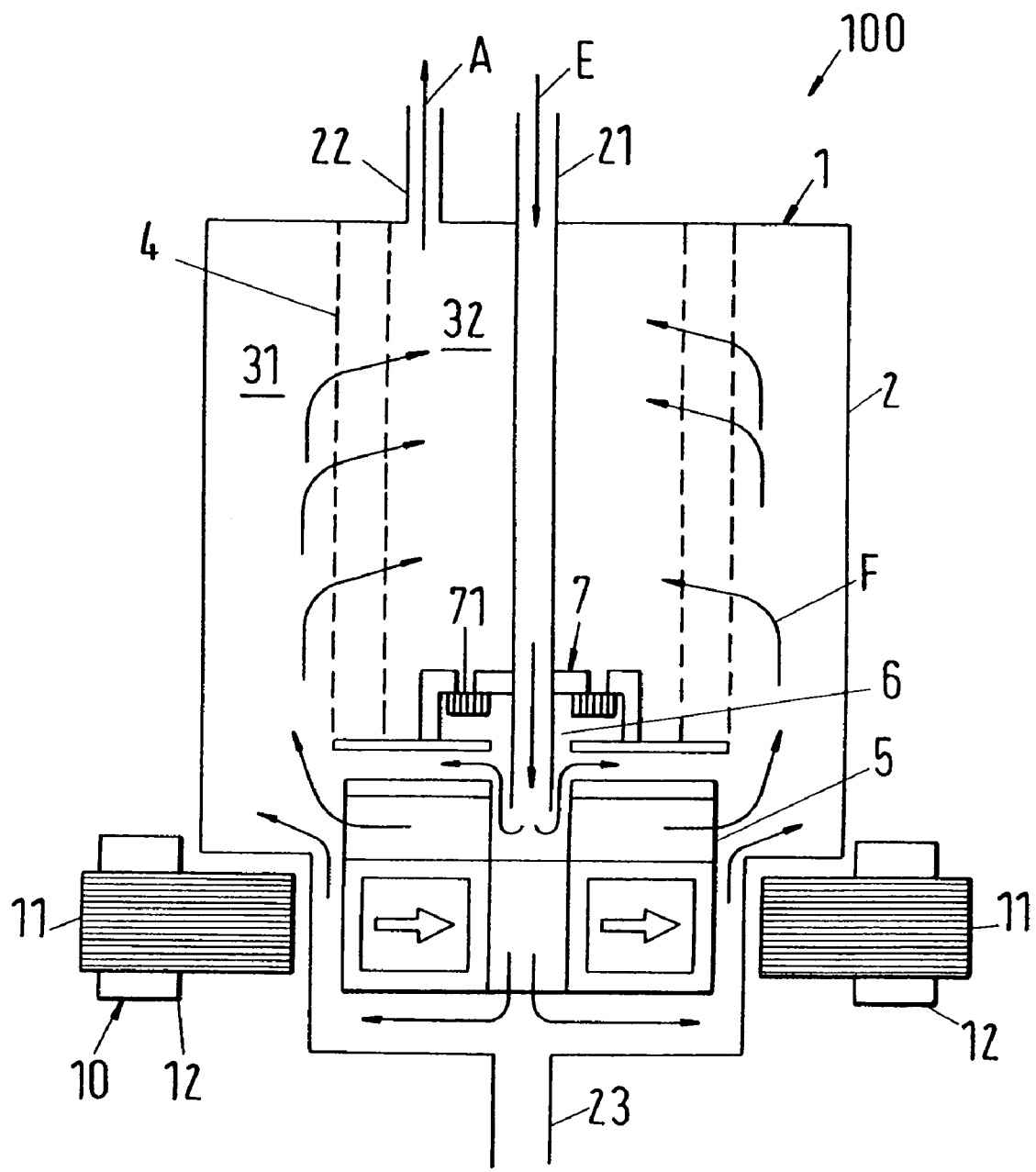

In the following the invention is explained in more detail with reference to embodiments and to the drawing both from the point of view of the apparatus and from the point of view of the technical method. In the schematic drawing there are shown, partly in section:

FIG. 1 an embodiment of a filter and pump apparatus in accordance with the invention having a first embodiment of a filter and pump unit in accordance with the invention, FIG. 2 a second embodiment of a filter and pump unit in accordance with the invention, FIG. 3 a third embodiment of a filter and pump unit in accordance with the invention, FIG. 4 a variant of the third embodiment.

Figure 5:
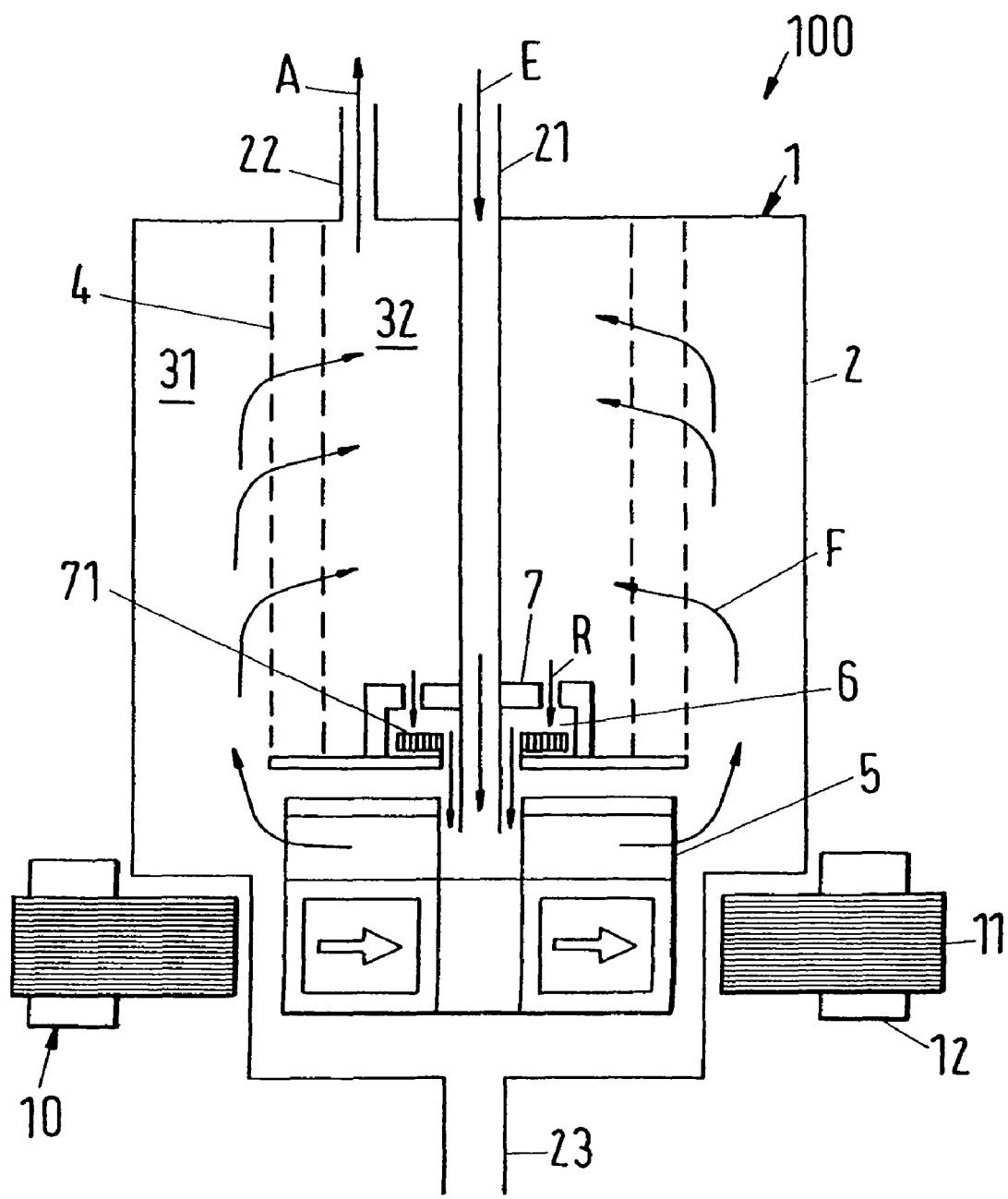

FIG. 5 as in FIG. 4 but with an opened valve, and

Figure 6:
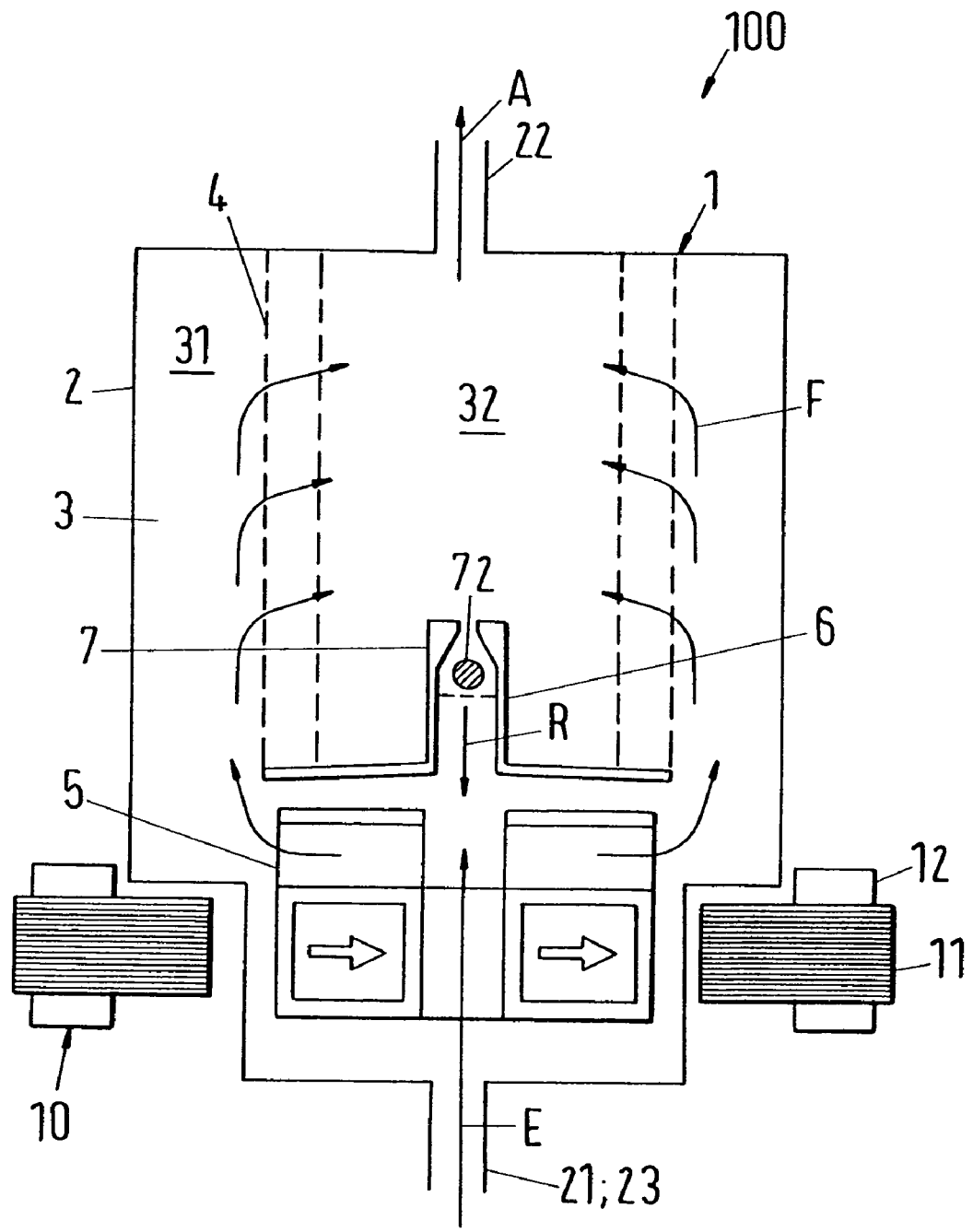

FIG. 6 a further embodiment.

FIG. 1 shows in a schematic sectional drawing an embodiment of a filter and pump apparatus in accordance with the invention which is provided as a whole with the reference numeral 100. The apparatus 100 includes a drive unit 10 and also a first embodiment of a filter and pump unit in accordance with the invention, which is designated as a whole with the reference numeral 1.

The filter and pump unit 1 for the filtering of particles out of a fluid includes a filter housing 2 which bounds a filter space 3. An inlet 21 and an outlet 22 are provided at the filter housing 2 through which the fluid to be filtered can be introduced into the filter space 3, as is indicated by the arrow E by which the filtered fluid can respectively be led away out of the filter space, as is indicated by the arrow A. Furthermore, a drain 23 is provided at the filter housing 3 through which the fluid can be drained in order to empty the filter space 3. In the first embodiment shown in FIG. 1 the drain 23 is identical with the inlet 21. It will be understood that the inlet 21, the outlet 22 and the drain 23 can each be provided with a (non-illustrated) valve or other block off or regulating member which can in each case be manually and/or electrically i.e. actuated automatically.

A filter element 4 which is only schematically illustrated is provided in the filter space 3. The filter element 4 is designed here in manner known per se as an exchangeable filter cartridge. The filter element 4 has a substantially cylindrical shape and a base 41 which is either an integral component of the filter element 4 or a separate part on which the filter element 4 is mounted. A filter membrane is provided on the jacket surface of the cylinder. The filter element 4 demarcates an inlet region 31 of the filter space from an outlet region 32. The inlet region 31 means that part of the filter space 3 which is available to the fluid to be filtered prior to flowing through the filter element 4, i.e. the region of a filter space disposed upstream of the filter element. The inlet region 31 is connected to, i.e. communicates with, the inlet 21 which is provided in the lower wall shown in the drawing, i.e. in the base of the filter housing 3. The outlet region 32 means the region of the filter space 3 into which the fluid passes after flowing through the filter element 4, i.e. the region of the filter space 3 disposed downstream of the filter element 4. In the embodiment shown this is the inner space of the substantially cylindrical filter element 4. The outlet region 32 is connected to, i.e. communicates with, the outlet 22 which is provided in the upper wall of the filter housing in accordance with the drawing.

As shown in the drawing an impeller 5 is provided in the filter housing 2 beneath the filter element 4 which, as part of a rotary pump, preferably a centrifugal pump, pumps the fluid from the inlet region 31 through the filter element 4 into the outlet region 32. The impeller 5 has a plurality of vanes 51 for the pumping of the fluid as is indicated by the arrows F. In accordance with a preferred embodiment the impeller 5 is equipped with a contact-free fully magnetic bearing. For this purpose the impeller 5 includes, for example, at least one permanent magnet 52 surrounded by a jacket 53, in the present embodiment a permanent magnetic ring. The magnetization of the permanent magnet 52 is indicated by the arrow without a reference numeral.

The impeller 5 is arranged in the region of the base of the filter housing 2. The filter housing 2 is made substantially cylindrical, with a cylindrical region 24 being provided in the lower part in accordance with the illustration, which has a smaller diameter than the remainder of the cylinder housing 2.

The driving of the impeller preferably also takes place without mechanical contact. i.e. in contact-free manner, that is to say there is no mechanical coupling between the impeller 5 and the drive unit 10. For this purpose the drive unit 10 includes a stator 11 with a stator winding 12 in order to drive the impeller 5. The stator is of substantially ring-shaped design and surrounds the lower cylindrical region of the filter housing 2 in which the impeller 5 is arranged. The checking and control device for the rotary pump including the drive unit 10 and the impeller 5 is not shown for reasons of simplicity in FIG. 1.

In a particularly preferred design the impeller 5 is formed as an integral rotor and the drive unit 10 together with the impeller 5 is designed as a bearing-free motor. A rotary pump of this kind is, for example, disclosed in EP-A-0 819 330 and in U.S. Pat. No. 6,100,618. The term "integral rotor" means in this connection that the impeller 5 of the pump and the rotor of the motor driving the pump are identical. The impeller 5 thus functions both as a rotor of the motor drive and also as the rotor of the pump. The term "bearing-free motor" means, that the impeller is fully magnetically journalled with no separate magnetic bearings being provided. The stator 11 is both the stator of the electrical drive and also the stator of the magnetic bearing. For this purpose, the stator winding 11 includes a drive winding with the pole pair number p and also a control winding with the pole pair number p±1. In this way it is possible to both drive the impeller 5 and also to magnetically journal it in the stator 11 in completely contact-free manner. With respect to further details, of such a rotary pump reference should be made here to the documents already cited.

During the operation the stator winding 12 controlled by a non-illustrated checking and control device generates a rotary driving field which brings about a torque on the impeller 5 and sets this rotating. Furthermore, the control winding of the stator winding 12 generates a magnetic control field with which the position of the impeller relative to the stator 12 can be regulated.

Naturally designs are also possible of the kind in which a separate magnetic bearing system is provided for the impeller that is to say a magnetic bearing system different from the drive stator 12 or designs in which mechanical bearings or other bearings such as for example hydrodynamic bearings are provided in addition or as an alternative.

In accordance with the invention a flow connection 6 is provided between the outlet region 32 of the filter space 3 and the impeller 5 through which at least a part of the fluid can flow-back from the outlet region 32 to the impeller 5. This re-circulation of the fluid is indicated by the arrow R. In the first embodiment the flow connection 6 includes an opening which is provided in the base 41 of the filter element 4. The fluid can flow through this flow connection 6 out of the outlet region 32 to the vanes of the impeller 5 rotating below the filter element 4 and is re-circulated by it. The choice of the material for the filter membrane of the filter element 4 and the pore size or structure width of the filter membrane depends on the application. The term pore size means a characteristic filter size (filter rating) which is a measure for the average pore size of the filter membrane. The term "filter membrane" also means sieves, sheet metal screens or net-like structures for filtration.

In the case of applications in the semiconductor industry, for example for cleaning or etching in CMP processes or for filtering of acids or photoresists, fluoropolymers are frequently used as a material for the filter membrane. Examples here are PTFE and PVDF. Naturally filter membranes and filter elements 4 of other materials are also possible, for example of other plastics, composite materials, ceramics or ceramic coated substances. The filter membranes can be manufactured in that foils or thin materials are pierced, bored, lasered, holed with an electron beam or cut with a water jet, with other techniques also entering to consideration. Naturally it is not necessary for the filter element to be substantially cylindrically designed or to have an inner space at al. The filter element can for example also be designed as a planar membrane or as a planar screen. The filter and pump unit 1 serves for the filtering out of particles from a fluid, in particular for the production of highly pure chemicals or highly pure water. Such substances are for example required in the semiconductor industry and in chip production. As examples of such fluids relevant in practice acids should be named here which are used for the cleaning and etching of wafers. As a result of the extremely small structures which are nowadays realized on chips and their characteristic dimensions, for example the gate length lying in the range of significantly below 100 nm (for example 32 nm) it is necessary to filter out from the acids or chemicals that are used even particles which are smaller than 15 nm because they are already large enough in order to cause defects on the chip. With the finest filter elements that are available nowadays, which have a nominal pore size of 30 nm particles down to approximately 30 nm can be reliably filtered out in conventional filter devices. For the present invention the recognition is important that through the re-circulation of the fluid to be filtered, that is to say with flow through the filter element 4 taking place a plurality of times, particles can be reliably filtered out which are significantly smaller than the nominal pore size of the filter element 4. For example, with the filter and pump unit 1 in accordance with the invention or with the method of the invention particles which are smaller than 15 nm can be filtered out using a filter element with a nominal pore size of 30 nm.

In the operating state of the filter and pump apparatus 100 the inlet 21 of the filter and pump unit 1 is connected to a fluid source and the outlet 22 is connected to a metering, dispensing or storage unit for the filtered fluid. Through the rotation of the impeller 5 the fluid is sucked in through the inlet 21 and is pumped by the vanes 51 through the filter element 4 into the outlet region 32. From there a part of the filtered fluid leaves the filter and pump unit 1 through the outlet 22 (arrow A). Another part again reaches the vanes 51 of the impeller 5 (arrow R) through the flow connection 6 and is in this way re-circulated and pumped again by the vanes 51 of the impeller 5 through the filter element 4.

In order to achieve a particularly good filtration the fluid to be filtered is moved many times through the filter element 4 before it flows out of the outlet 22. For example, the quantity of the fluid re-circulated per unit of time can amount to approximately fifty times the quantity of fluid which flows through the outlet 22 per unit of time. That is to say, if one liter of fluid flows out through the outlet 22 per minute then 50 liters of fluid are re-circulated in the same time. This corresponds, statistically considered, to the fact that the fluid flows approximately fifty times through the filter element before it flows out through the outlet 22.

In practice it has proved advantageous, when the quantity of the fluid re-circulated per unit of time is substantially larger than the quantity of the fluid pumped per unit of time through the outlet 22.

Through the re-circulation measure particles with a size significantly smaller than the nominal pore size of the filter element 4 can be reliably filtered out.

In order that an adequately good filtration of the fluid is ensured directly after the start of operation the outlet can first be closed by a non-illustrated blocking member so that the fluid is initially completely re-circulated. After a presetable time the outlet 22 is then opened and the pumping of the fluid which has already flowed through the filter element a plurality of times can begin.

The ratio between the re-circulated and expelled quantity of fluid is flow-mechanically determined and can be set to a desired value. The setting of this ratio can take place with the aid of one or more of the following parameters, which is not an exclusive list: size, for example diameter of the outlet 22 or inlet 21, size of the flow connection 6, flow resistance of the flow connection 6 or of the inlet 21 or of the outlet 22, geometry of the impeller 5 and the vanes 51, spacing of the impeller 5 from the wall of the filter housing 2, speed of rotation/pumping performance of the centrifugal pump, pressure drops at the outlet.

The setting of the ratio between the re-circulated and the expelled quantities of fluid can be regulated by regulating valves at the flow connection 6 and/or at the outlet 22. In FIG. 1 regulating valve 73 is shown as an optional element at the flow connection 6 between the outlet region 32 and the impeller 5. Through this regulating valve 73 the quantity of fluid which flows back through the flow connection can be set in a simple manner and thus the ratio between the re-circulated and expelled quantities of fluid.

The filter housing 2 with the impeller 5 and the filter element 4 is preferably designed as a disposable unit, for example as a disposable cartridge. For this purpose the filter housing 2 can be manufactured in one piece with the filter element 4 and the impeller 5 contained therein. This filter and pump unit 1 can be used in the drive device 10 and is immediately ready for operation. After termination of the process or when, for example, the filter element is worn or blocked the entire filter and pump unit 1 is removed from the drive device 10, disposed off and, if required, is replaced by a new one.

The filter housing 2 can naturally also be designed in such that a way that one can open it and close it again. With such a design it is possible to exchange either only a filter element 4 or only the impeller 5 or the filter element 4 and the impeller 5. Naturally it is also possible in this embodiment to replace the entire filter and pump unit by a new one.

Designs in which the impeller 5 and the filter element 4 are arranged in a common filter housing 2 which can be made closable and openable are particularly preferred.

In the following description of the further embodiments the same parts or equivalent parts are designated with the same reference numerals as in FIG. 1. The explanations with respect to the first embodiment apply in the same sense and manner also for the other embodiments and their variants. In the following only the modifications and distinctions with respect to the first embodiment will be discussed. Vice versa some measures and designs of the embodiments described in the following can also be used for the first embodiment.

FIG. 2 shows a second embodiment of a filter and pump unit 1 in accordance with the invention. In this embodiment the filter element 4 is designed as a sponge-like filter medium (deep media) which is essentially of hollow-cylindrical shape and extends from an inner support 42 up to the inner wall of the filter housing 2. The inner support 42 is made permeable, for example grid- or net-like so that the fluid, after flowing through the filter medium 4 can flow in the inner space of the filter medium 4 through the flow connection 6 back to the impeller 5.

The inlet 21 is provided here in the upper wall and extends in the form of a tube 211 through the outlet region 32 in the interior of the filter element 4 up to the impeller 5. In order to avoid a flow short circuit (a direct flow of the fluid from the inlet 21 to the outlet 22 without flowing through the filter element 4) the inner support 42 is designed in the upper region as shown in the drawing as a massive that is to say fluid-impermeable wall 43. In this way a situation is avoided in which the fluid emerges out of the tube 211 and then flows directly back to the flow connection 6 in the inner space of the filter element 4 and, in accordance with the illustration, can flow above the filter element 4 to the outlet 22 without flowing through the filter element 4.

FIG. 3 shows a third embodiment of a filter and pump unit 1 in accordance with the invention. In this embodiment the filter element 4 is designed in the same way as in FIG. 1. The inlet 21 is provided centrally in the upper boundary surface of the filter housing 2 and extends from there in the form of a tube 211 through the outlet region 32 into the interior of the filter element 4 and through the flow connection 6 up to the impeller 5. It will be understood that the drain 23 in the base of the filter housing 2 which is here different from the inlet 21 is normally closed during the operation of the apparatus 100.

FIGS. 4 and 5 show an advantageous variant of the third embodiment. Here the flow connection 6 is provided with a non-return device 7. This allows the fluid to pass only in one direction, namely from the outlet space 32 to the impeller 5, but not however in the reverse direction, i.e. from the impeller 5 or from the inlet space 31 into the outlet space 32. In this way a flow short circuit between the inlet 21 and the outlet 22 is prevented. The non-return device 7 is designed here as a direction control valve with a ring-like valve body 71. The direction control valve blocks the passage of the fluid in one flow direction automatically. Naturally other embodiments of the non-return device 7 are possible. FIG. 4 shows a non-return device 7 in the close state. FIG. 5 shows the non-return device 7 in the state opened by the flowing fluid.

FIG. 6 shows a further embodiment. Here the inlet 21 is provided—as in the first embodiment—in the base of the filter housing 2 whereas the outlet 22 is provided centrally in the upper wall of the filter housing. The flow connection 6 is provided with a non-return valve as a non-return device 7. This only permits the fluid to pass in one direction, namely from the outlet space 32 to the impeller 5, but not in the reverse direction, i.e. from the impeller 5 or from the inlet space 31 into the outlet space 32. Thus a flow short circuit between the inlet 21 and the outlet 22 is prevented in particular during the start-up of the filter pump device 100. the non-return valve here includes a ball member 72 which is spring-loaded into the valve seat in the manner known per se.

In addition to the non-return device 7 a regulating valve can also be provided—as is for example shown in FIG. 1—in order to set the quantity of the fluid flowing back through the flow connection 6 to a pre-determinable value. It will be understood that the function of the non-return device 7 and of the regulating valve 73 (FIG. 1) can also be realized in a single valve.

It is possible, as an alternative or as a supplement to the regulating valve 73 or the non-return device 7, to provide at least one further regulating valve at the outlet 22 in order to set the ratio between the quantity of the fluid which flows per unit of time through the outlet 22 and the quantity of fluid which flows per unit of time through the flow connection 6 out of the outlet region 32 back to the impeller 5. These means for a setting of the ratio are preferably so designed that the ratio between the expelled and re-circulated quantities of fluid can be steplessly adjusted. It is however also possible to design the means such that the ratio can only be set to certain discrete values.

Naturally many further variants and embodiments are possible, for example the impeller can also be arranged in the interior of the filter element 4. Those embodiments are preferred in which the impeller 5 with the drive device 10 forms a centrifugal pump and in which the filter element 4 is arranged at the pressure side (and not at the suction side). Furthermore, it is preferred, for cylindrical or other filter elements 4 which have an inner space, when the flow takes place through the filter element 4 from the outside to the inside, i.e. when flow takes place onto the side of the largest surface area.

The invention claimed is:

1. A filter and pump unit for the filtering out of particles from a fluid, the filter and pump unit comprising:
    a filter housing (2) that bounds a filter space (3) and has an inlet (21) and also an outlet (22) for the fluid to be filtered;
    a filter element (4) provided in the filter space (3), the filter element demarcating an inlet region (31) from an outlet region (32) of the filter space (3), with the inlet region (31) being in fluid communication with the inlet (21) and the outlet region (32) being in fluid communication with the outlet (22), the filter element (4) having an axial opening for a flow connection (6);
    an impeller (5) that, as part of a rotary pump, is constructed and arranged to pump the fluid from the inlet (21) to the inlet region (31) so that the fluid flows through the filter element (4) into the outlet region (32); and
    the flow connection (6), the outlet region (32) being in fluid communication with the impeller (5) through the flow connection (6) so that at least a part of the fluid flows back from the outlet region (32) axially through the flow connection (6) to the impeller (5), the flow connection (6) having a flow resistance, the part of the fluid that flows back to the impeller (5) being moved by the impeller (5) to the inlet region (31).

2. A filter and pump unit in accordance with claim 1, in which the impeller (5) is constructed for contact-free magnetic journalling.

3. A filter and pump unit in accordance with claim 1, in which means are provided that prevent a flow short circuit between the inlet (21) and the outlet (22).

4. A filter and pump unit in accordance with claim 1, in which a non-return valve (7) is provided in the flow connection between the outlet region (32) and the impeller (5).

5. A filter and pump unit in accordance with claim 1, wherein said unit is operable such that the quantity of the fluid that flows per unit of time through the outlet (22) is smaller than the quantity of fluid that flows per unit of time through the flow connection (6) out of the outlet region (32) back to the impeller (5).

6. A filter and pump unit in accordance with claim 1, in which means (7, 73) are provided which enable a setting of the ratio between the quantity of fluid that flows per unit of time through the outlet (22) and the quantity of fluid that flows per unit of time through the flow connection (6) out of the outlet region (32) back to the impeller (5).

7. A filter and pump unit in accordance with claim 6, in which at least one regulating valve (73) is provided that enables the setting of the ratio of the two quantities of fluid.

8. A filter and pump unit in accordance with claim 1, in which a regulating valve (73) is provided at the flow connection (6) between the outlet region (32) and the impeller (5).

9. A filter and pump unit in accordance with claim 1, in which the filter housing (2) with the filter element (4) and the impeller (5) is constructed as a removable and replaceable unit.

10. A filter and pump apparatus having a filter and pump unit which is constructed in accordance with claim 1, the filter and pump apparatus comprising a drive unit (10) for the driving of the impeller (5).

11. A filter and pump apparatus in accordance with claim 10 in which the drive unit (10) is magnetically coupled to the impeller (5).

12. A filter and pump apparatus in accordance with claim 10 in which the impeller (5) is formed as an integral rotor and the drive unit (10) with the impeller (5) is constructed as a bearing-free motor.

* * * * *